United States Patent Office 3,340,314
Patented Sept. 5, 1967

3,340,314
METHOD OF PREPARING NITROSOHYDRO-
CARBON DIMERS
William D. Blackley, Wappingers Falls, N.Y., assignor to Texaco Inc., New York, N.Y., a corporation of Delaware
No Drawing. Filed Nov. 18, 1966, Ser. No. 595,347
3 Claims. (Cl. 260—647)

This invention relates to a method of preparing nitrosohydrocarbon dimer of the formula $(R-NO)_2$ where R is hydrocarbyl by contacting a hydrocarbon with O-nitroso-bis(perhaloalkyl)hydroxylamine.

In the past, the nitrosohydrocarbon dimer products were prepared by reaction of ClNO with the hydrocarbon under ultraviolet irradiation. Although this past method was satisfactory in many respects it had the disadvantage of requiring ultraviolet activation which in turn requires relatively costly handling and process equipment.

I have discovered—and this constitutes my invention—a method of preparing nitrosohydrocarbon dimer which eliminates the aforementioned prior art disadvantage.

More specifically, the method of the invention comprises contacting a hydrocarbon of from 2 to 20 carbons selected from the group consisting of alkane, cycloalkane and alkyl substituted aromatic hydrocarbon with an O-nitroso-bis(perhaloalkyl)hydroxylamine of the formula $(R_x)_2NONO$ where $R_x$ is a perfluoroalkyl, perchloroalkyl, perfluorochloroalkyl of from 1 to 7 carbons. The reaction is advantageously conducted at a temperature between about 25 and 200° C., preferably between 50 and 100° C. utilizing a mole ratio of hydrocarbon reactant to hydroxylamine of desirably between about 10:1 and 1:1. This reaction is normally conducted in a period of between about 1 and 15 hours.

If the reactants tend to volatilize under reaction conditions, the method is preferably conducted in a closed container and/or under superatmospheric pressure in order to maintain contact between the reactants.

In order to further enhance the reactant contact if one or more of the reactants are solid an inert liquid diluent solvent such as carbon tetrachloride can be employed to facilitate reactant contact. The diluent solvent is desirably utilized in an amount of between about 40 and 90 wt. percent of the reaction mixture.

The dimer product is recovered from the reaction mass by standard means such as fractional distillation and/or selective solvent extraction.

The dimer product is of the following general structural formula:

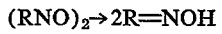

where R is a hydrocarbyl of from 2 to about 20 carbons selected from the group consisting of alkyl, cycloalkyl and aralkyl.

It is to be noted the dimer products with varying degrees of ease rearrange to the corresponding oxime in accordance with the following equation:

$$(RNO)_2 \rightarrow 2R=NOH$$

where R is as heretofore defined. The nitrosocyclohexane dimer requires the presence of acid, e.g., HCl, to rearrange to the cyclohexanone oxime, whereas nitrosododecane dimer will more readily rearrange to corresponding dodecanone oxime and in fact the latter normally forms as one of the final products in the method of the invention. Therefore, the term "nitrosohydrocarbon dimer" employed herein inherently includes within its definition the spontaneously occurring corresponding oxime rearrangement product of the nitrosohydrocarbon dimer as well as the dimer itself.

Specific examples of the hydrocarbon reactant contemplated herein are cyclopentane, cyclohexane, propane, dodecane, heptadecane, toluene, n-propylbenzene, and 1-methylnaphthalene.

Specific examples of the O-nitroso-bis(haloalkyl)-hydroxylamine reactant contemplated herein are O-nitroso-bis - (perfluoromethyl)hydroxylamine, O-nitroso - bis(2-chlorotetrafluoroethyl)hydroxylamine and O-nitroso-bis-(perchlorohexyl)hydroxylamine. They are normally prepared by exposing the corresponding nitrosoperhaloalkane to ultraviolet light in accordance with the following equation:

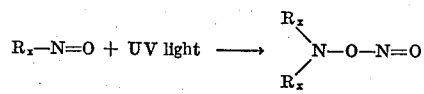

where $R_x$ is as heretofore defined.

Examples of the dimer products contemplated herein are nitrosocyclohexane dimer, nitrosocyclopentane dimer, nitrosopropane dimer, nitrosododecane dimer, nitrosoheptadecane dimer, nitrosomethylbenzene dimer, nitrosopropylbenzene dimer and 1-nitrosomethylnaphthalene dimer.

The nitrosohydrocarbon dimers prepared by the method of the invention are useful in the manufacture of polymeric fiber materials in that they are readily rearranged to their corresponding oxime, $R=NOH$, where R is as heretofore defined, the oximes being precursor in polymer fiber manufacture. For example, nitrosocyclohexane dimer rearranges in the presence of acid to cyclohexanone oxime which is a precursor in the caprolactam polymer manufacture.

The following examples further illustrate the invention but are not to be construed as limitations thereof:

*Example I*

To a 250 cc. Pyrex flask there was charged 5 grams (0.6 mole) cyclohexane and 1.46 grams (.0087 mole) O-nitroso-bis(trifluoromethyl)hydroxylamine. The flask was then sealed and maintained at a temperature of 25° C. for a period of 9 days in which time little reaction was observed. The temperature was then raised to 50° C. for a period of 23 hours and a complete reaction resulted. The reaction mixture was subjected to vacuum (1 mm. Hg) distillation at 25° C. The resulting solid weighing 0.82 gram was characterized by infrared and nuclear magnetic resonance analysis as the nitrosocyclohexane dimer of the structural formula:

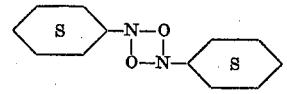

The melting point of the product was 115–118° C. after being recrystallized from aqueous ethanol.

*Example II*

To a 250 cc. Pyrex glass there was added 19.3 grams (0.25 mole, 25cc.) cyclohexane and 3.8 grams (0.019 mole) O-nitroso-bis(trifluoromethyl)hydroxylamine. The flask was then sealed and heated to 50° C. for a period of 16 hours upon which time the hydroxylamine reactant was fully reacted. The flask content was subjected to a vacuum distillation (1 mm. Hg) at 25° C. The solid residue weighed 2.4 grams and had a melting point of 119.5–120.5° C. after being recrystallized from pentane. It was identified by melting point, infrared (characteristic absorption at 1200 cm.$^{-1}$), elemental and molecular weight analyses as the nitrosocyclohexane dimer of the empirical formula $(C_6H_{11}NO)_2$. Specifically, the molecular weight of the dimer was found to be 230 (theory=226) and an elemental analysis of the following:

| Element | Found, wt. percent | Calc. For $(C_6H_{11}NO)_2$, wt. percent |
| --- | --- | --- |
| Carbon | 62.4 | 63.6 |
| Hydrogen | 9.5 | 9.7 |
| Nitrogen | 12.5 | 12.4 |
| Fluorine | 0 | 0 |

*Example III*

To a 250 cc. Pyrex bulb there was charged 10 grams toluene and the bulb was degassed at liquid nitrogen temperature. To the toluene containing degassed bulb there was charged 1.17 grams (.007 mole) of O-nitroso-bis(trifluoromethyl)hydroxylamine. The bulb was sealed and placed in an oven at 50° C. The vapor phase changed from brown to colorless in about two hours. In the form of two separate charges totaling 2.01 grams (.012 mole) additional O - nitroso-bis(trifluoromethyl)hydroxylamine were added, and the reaction was continued for an additional several hour period. The individual products in the final reaction product were separated by elution chromatography. Infrared analysis of the product determined the presence of benzaldoxime of the formula:

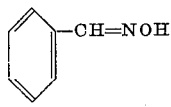

which resulted from the spontaneous rearrangement of the nitrosomethylbenze dimer of the formula:

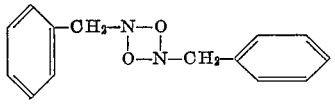

I claim:
1. A method of preparing a nitrosohydrocarbon dimer comprising contacting a hydrocarbon of from 2 to 20 carbons selected from the group consisting of alkane, cycloalkane, and alkyl substituted aromatic hydrocarbon with an O-nitroso-bis(perhaloalkyl)hydroxylamine of the formula $(R_x)_2NONO$ where $R_x$ is a member having from 1 to 7 carbon atoms selected from the group consisting of perfluoroalkyl, perchloroalkyl and perchlorofluoroalkyl.
2. A method in accordance with claim 1 wherein said contacting is conducted at a temperature between about 25 and 200° C. utilizing a mole ratio of said hydrocarbon to said hydroxylamine of between about 10:1 and 1:1.
3. A method in accordance with claim 2 wherein said nitrosohydrocarbon dimer is nitrosocyclohexane dimer, said hydrocarbon is cyclohexane and said O-nitroso-bis-(perhaloalkyl)hydroxylamine is O-nitroso-bis(perfluoromethyl)hydroxylamine.

References Cited

UNITED STATES PATENTS 2,419,976   5/1947   Trepagnier et al. _____ 260—647
3,205,273   9/1965   Flanagan _____ 260—647

OTHER REFERENCES

Emmons: J. Am. Chem. Soc., vol. 79, pp. 6522-4 (1957).

Kooy, Jr.: Netherland application 6,500,271, printed Aug. 2, 1965, 15 pages of specification.

CARL D. QUARFORTH, *Primary Examiner.*

L. A. SEBASTIAN, *Assistant Examiner.*